United States Patent [19]
Binford et al.

[11] Patent Number: 5,875,343
[45] Date of Patent: Feb. 23, 1999

[54] EMPLOYING REQUEST QUEUES AND COMPLETION QUEUES BETWEEN MAIN PROCESSORS AND I/O PROCESSORS WHEREIN A MAIN PROCESSOR IS INTERRUPTED WHEN A CERTAIN NUMBER OF COMPLETION MESSAGES ARE PRESENT IN ITS COMPLETION QUEUE

[75] Inventors: Charles D. Binford; Michael J. Gallagher; Craig C. McCombs, all of Wichita, Kans.

[73] Assignee: LSI Logic Corporation, Milpitas, Calif.

[21] Appl. No.: 822,591

[22] Filed: Mar. 20, 1997

Related U.S. Application Data

[62] Division of Ser. No. 546,003, Oct. 20, 1995, Pat. No. 5,671,365.

[51] Int. Cl.⁶ .................................................. G06F 13/00
[52] U.S. Cl. ........................................... 395/736; 395/859
[58] Field of Search ........... 395/200.41, 200.43–200.46, 395/680, 292, 859, 874, 474, 475, 736

[56] References Cited

U.S. PATENT DOCUMENTS

| | | | |
|---|---|---|---|
| 4,080,649 | 3/1978 | Calle et al. .............................. | 364/200 |
| 4,313,162 | 1/1982 | Baun et al. .............................. | 364/200 |
| 4,745,544 | 5/1988 | Renner et al. ........................... | 364/200 |
| 4,980,820 | 12/1990 | Youngblood ............................ | 364/200 |
| 5,038,282 | 8/1991 | Gilbert et al. ........................... | 364/200 |
| 5,131,081 | 7/1992 | MacKenna et al. ..................... | 395/275 |
| 5,220,661 | 6/1993 | Hu et al. ................................. | 395/557 |
| 5,224,215 | 6/1993 | Disbrow ............................ | 395/200.64 |
| 5,278,984 | 1/1994 | Batchelor ................................ | 395/650 |
| 5,313,584 | 5/1994 | Tickner et al. .......................... | 395/275 |
| 5,367,643 | 11/1994 | Chang et al. ............................ | 395/309 |
| 5,371,860 | 12/1994 | Mura et al. .............................. | 395/325 |
| 5,418,913 | 5/1995 | Fujimoto ................................. | 395/200 |
| 5,452,299 | 9/1995 | Thessin et al. ............................ | 370/62 |
| 5,506,967 | 4/1996 | Barajas et al. .......................... | 395/250 |
| 5,574,862 | 11/1996 | Marianetti, II ......................... | 295/280 |
| 5,600,816 | 2/1997 | Oldfield et al. ......................... | 395/440 |
| 5,617,570 | 4/1997 | Russell et al. .......................... | 395/684 |
| 5,619,682 | 4/1997 | Mayer et al. ............................ | 395/500 |
| 5,621,898 | 4/1997 | Wooten ................................... | 395/297 |
| 5,644,786 | 7/1997 | Gallagher et al. ...................... | 395/850 |

*Primary Examiner*—Lance Leonard Barry
*Attorney, Agent, or Firm*—Daniel N. Fishman; Wayne P. Bailey

[57] ABSTRACT

Apparatus and associated methods for improving I/O performance in a computing system which includes one or more MPUs and one or more IOPs. I/O requests are queued by a requesting MPU in a memory shared with one or more IOPs. Each IOP is associated with a queue. Each IOP may continue processing queued I/O requests after completing processing on an earlier request. In addition, each MPU is associated with a queue shared with the IOPs. When an IOP completes processing of an I/O request, a completion message is added to the requesting MPU's queue and an interrupt is generated for that MPU. The MPU services all completion messages in its queue when the interrupt is processed. A threshold value is associated with each MPU queue. The threshold value indicates the minimum number of completed I/O requests required before an interrupt request is generated to the MPU. The threshold value for each MPU may be tuned to permit the computing system to balance the need for rapid I/O response time with the need for reduced interrupt overhead processing in the MPU. Various physical embodiments of the invention are disclosed wherein the queue is located in either a shared memory or in a register file. Additionally, various embodiments separate the queue used to store new I/O requests from the queue used to store completion messages while other embodiments merge the two queuing functions into a single queue where each entry contains an I/O request with a completion status field.

16 Claims, 8 Drawing Sheets

EMPLOYING REQUEST QUEUES AND COMPLETION QUEUES BETWEEN MAIN PROCESSORS AND I/O PROCESSORS WHEREIN A MAIN PROCESSOR IS INTERRUPTED WHEN A CERTAIN NUMBER OF COMPLETION MESSAGES ARE PRESENT IN ITS COMPLETION QUEUE

This is a Division of application No. 08/546,003, filed Oct. 20, 1995 now U.S. Pat. No. 5,671,365.

BACKGROUND OF THE INVENTION

1. Field of the Invention

The invention relates generally to a computing system input/output (I/O) architecture wherein one or more main processors (MPUs) communicate with one or more I/O sub-processors (IOPs) to achieve high performance I/O throughput. More specifically, the invention relates to a an I/O system of reducing the overhead incurred in initiating an I/O request and in servicing interrupts associated with completed I/O requests.

2. Background of the Invention

It has long been a problem in the computing arts to maintain high performance I/O throughput to or from peripheral devices while reducing the wasteful overhead processing required to perform the I/O operations. In particular, in multi-user/multi-tasking computing environments, it is important that the I/O overhead be kept to a minimum to permit the main processor to service the needs of other users/tasks as one user/task generates I/O processing.

It is common that I/O peripheral devices are attached to a main processor through I/O controller circuits, I/O controller circuits manage the lower level details of operating a peripheral I/O device to relieve the main processor of this burden. For example, a seek operation on a rotating disk drive requires a significant number of lower level operations relating to servo motor controls, actuator controls, and various sense circuits to detect the proper positioning of the read/write head. When a specific requested operation is completed, the I/O controller circuit would perform the required low level operations, then interrupt the main processor to signify completion and await further instructions.

The speed of peripheral I/O devices has increased steadily over time. For example, rotating disk drive mass storage devices now rotate faster than earlier designs and store data more densely on the recording surface (magnetic or optical recording surfaces). The increased speed of peripheral devices tends to increase the frequency of interruption of the main processor for servicing interrupts indicating completion of I/O requests previously initiated by the main processor. To reduce the number of such interrupts of the main processor, I/O peripheral controller circuits have been designed with increased "intelligence" to reduce the number of interrupts of the main processor associated with completion of each 110 request.

Controller circuits which control I/O peripheral devices attached to a small computer system interface bus (referred to herein as SCSI) exemplify the evolution of "intelligence" in I/O peripheral device controllers. Early (so called "first generation") SCSI I/O peripheral device controller circuits required many low level commands to accomplish a single I/O operation. These early I/O peripheral device controller circuits typically interrupted the main processor following completion of each low level command. In SCSI bus control as performed by first generation SCSI control circuits, a single I/O request may include commands to arbitrate for the SCSI bus, commands to select the target device, commands to request the data transfer, commands to disconnect and reconnect the peripheral from the SCSI bus, and various commands to change the SCSI bus state in association with these other commands. Therefore, a single I/O request could require several low level I/O commands be generated to the I/O controller and would generate a corresponding plurality of interrupt requests to the main processor to indicate completion of the plurality of commands. In this first generation I/O architecture, the main processor and the I/O controller would operate synchronously, each waiting for the other to proceed to its next step. Second generation SCSI controller circuits introduced several multiphase commands which automatically sequenced through several of the states and low level operations required to complete a single I/O request. Fewer commands and corresponding interrupts (possibly as low as one) would be generated to the main processor for each I/O request processed. Many of these second generation I/O controller were capable of handling multiple I/O requests. Third generation SCSI controller circuits added various "scripting" functions to permit more complex command sequences, including some exception conditions, to be handled by the SCSI controller without the need for interrupting the main processor. These third generation devices were capable of continuing processing after generating an interrupt to the main processor. Most such designs could therefore handle multiple I/O requests at the same time.

Other types of I/O peripheral device controller circuits have evolved in ways similar to the SCSI controller circuits. More intelligence has been added to the controller circuits to reduce the number of interrupts of the main processor to nearly one for each I/O request initiated by the main processor. As a further example, network controller circuits (i.e. Ethernet or Token Ring LAN controller circuits) have similar "intelligence" in their designs to reduce the number of interrupts of the main processor. A single I/O request of such intelligent LAN controllers may generate a single interrupt request of the main processor despite the fact that several interim steps or lower level commands may be completed to satisfy the single I/O request.

These prior design improvements in peripheral device controller circuits have helped reduce the overhead processing requirements in the main processor. However, as processor power increases, so increases the demands for processing power within the application programs running on the main processor. Despite these improvements, it remains a problem to reduce the processing overhead required of the main processor to thereby improve the performance of the overall system.

In view of the above it is clear that a need exists for an I/O system architecture which further reduces the I/O overhead processing required of the main processor associated with completion of I/O requests.

SUMMARY OF THE INVENTION

The present invention solves the above and other problems, and thereby advances the useful arts, by providing apparatus and associated methods which permit further improvements of I/O performance. Specifically, the present invention discloses an I/O system architecture in which one or more main processors communicate I/O requests to one or more I/O sub-processors through queues. In addition, I/O completion messages generated by the I/O sub-processors are queued to be returned to the requesting main processor.

The I/O sub-processor continues processing queued I/O requests as it completes each request. Unlike prior designs, there is no need to idly await another I/O request to be generated from a connect main processing unit. A single interrupt of the main processor may be generated to signify the completion of potentially several I/O requests in a queue. A further aspect of the present invention permits the use of these queues to be tuned to balance optimum performance of the main processor and the I/O peripheral devices.

The present invention encompasses a system design in which one or more main processors communicate with one or more I/O sub-processors through shared queues. A queue and associated control information may reside in a shared memory structure corresponding to each I/O sub-processor, or in register files within the I/O sub-processor. One or more main processors generate I/O requests in the sub-processor queue for which I/O data transfer is required. Similarly, a queue and associated control information may reside in a shared memory structure corresponding to each main processor, or in register files associated with the main processor. Sub-processors queue I/O request completion information (or exception condition information) in the queue associated with the main processor which generated the corresponding I/O request.

Alternative embodiments of the present invention include the association of the completion queue with the I/O sub-processor rather than the main processor, either in shared memory or in register files. Such alternative embodiments may be preferred where the I/O sub-processor lacks the processing power or flexibility to address completion queues associated with a plurality of main processors. Other alternatives include merging of the request and completion queues to a single queue by including a status message portion in each request queue entry. The status message portion is written by the I/O sub-processor to indicate that the corresponding I/O request entry is completed. Each of the various embodiments may be preferred under different circumstances that vary according to cost factors, host computing environment requirements (i.e. operating system requirements), hardware requirements and restrictions, etc. One of ordinary skill in the art will readily recognize such design choices and tradeoffs and select among them according to the particular application requirements.

The present invention includes methods utilizing the queued structures which permit one or more main processors to queue I/O requests to one or more I/O sub-processors. A main processor with an I/O request designating a particular I/O sub-processor adds the I/O request to the queue of the sub-processor. The I/O sub-processor associated with the queue removes the next queued request from its queue as a previous request is completed. A semaphore associated with the queue and the I/O sub-processor assures atomicity of the queue manipulation. This architecture permits multiple I/O requests to be queued (from one or more main processors) while the I/O sub-processor processes other I/O requests previously queued. This feature of the present invention permits the I/O sub-processor to maximize its operating time servicing a queue of pending I/O requests from a plurality of main processors as compared to the idle time common to prior designs when the I/O sub-processor is awaiting another I/O request from a main processor.

Another aspect of the present invention includes methods which permit one or more I/O sub-processors to queue I/O completion (or exception condition information) in the queue associated with the main processor which generated the corresponding I/O request. When an I/O sub-processor completes processing of an I/O request, a message indicating the completion of the request is added to a queue associated with the requesting main processor. An interrupt signal is generated and applied to the main processor. Other I/O requests may complete before the main processor begins to service the interrupt. These completion messages are similarly added to the queue associated with the main processor. When the main processor services the interrupt, it then removes and processes all completion messages added to its queue indicative of the completion of an earlier I/O request. A semaphore associated with the queue and the main processor assures atomicity of the queue manipulation. This feature reduces the number of interrupts required of the main processor. A plurality of completed I/O requests added to the queue may be serviced by a single interrupt of the main processor.

Queuing of I/O requests to the I/O sub-processors enables the I/O sub-processors to maintain a high level of throughput to or from the I/O peripheral devices. As an I/O request is completed, another request may be already queued on the request queue of the I/O sub-processor. In addition, the I/O sub-processors and main processors may operate concurrently (with complete parallelism and overlap) in that a main processor may queue a new I/O request regardless of the processing status at the I/O sub-processor.

Queuing of the completion messages back to the main processing units enables the main processing units to minimize the I/O processing overhead associated with interfacing to the I/O peripheral devices. The main processors interrupt service routine may process all queued completion messages when a single interrupt request is generated. This spares the main processor from the overhead processing of saving and restoring context of the processor for each I/O request completion message. In addition, the main processor may poll the I/O request completion queue at the end of its generation of a new request added to the request queue. If I/O completion messages are found in the queue, the main processor may be able to avoid the overhead of any interrupt service request processing by its early detection of the completion prior to the generation of an interrupt request. In either case, the main processor can process a plurality of queued I/O request completion messages with far less processing overhead than is possible with prior designs. Specifically, the present invention may reduce the I/O overhead processing to below one interrupt per I/O request; an improvement which is unattainable in prior designs.

A further aspect of the present invention includes methods which permit the balancing of I/O response time with the overhead processing of I/O interrupt servicing. I/O response time, as used herein, refers to the time between the main processor generating the I/O request and the I/O sub-processor completing the I/O request. It is desirable to reduce this time to thereby improve the response time for I/O requests in the main processor. However, it is also desirable to reduce the number of interrupts requested of the main processor. As noted above, each interrupt request causes the main processor to save and restore context of its current (interrupted) operation. By reducing the number of interrupts per I/O request per I/O request, the detection of the I/O completion by the main processor may be delayed. However, this effectively increases the I/O the total I/O throughput measured in I/O request per unit time as well as reducing the I/O overhead processing on the main processor.

In some applications of the I/O system of the present invention, it may be undesirable to increase I/O response time beyond certain levels. The present invention includes methods for setting a threshold parameter value indicative of the number of I/O requests to be completed before an interrupt is generated to the main processor. An interrupt threshold parameter associated with the queue corresponding to each main processor (or alternatively associated with the I/O sub-processor) may be set to indicate the minimum number of I/O requests to be completed before an interrupt request is generated to the main processor. Each of a plurality of main processors may be separately tuned by setting a unique threshold parameter. When this threshold value is greater than one, an individual I/O request completion message may be delayed until a sufficient number of I/O requests are completed. Only then will an interrupt be generated to the main processor. This delay potentially extends the I/O response time by delaying action on a particular I/O request until other I/O requests also complete. This feature of the present invention permits a computing system to be tuned by varying the threshold values to balance the needs for faster I/O response time with the needs for reduced interrupt processing overhead in the main processor.

It is therefore an object of the present invention to provide apparatus and associated methods for improving I/O performance of the computing system by maximizing the utilization of I/O sub-processors.

It is a further object of the present invention to provide apparatus and associated methods for reducing the main processor overhead required to service completion interrupts for I/O requests.

It is a further object of the present invention to provide apparatus and associated methods for increasing the total number of I/O requests completed per unit of time in a typical computer system.

It is a further object of the present invention to provide apparatus and associated methods for increasing the overlap of operations performed by one or more main processors and one or more I/O sub-processors.

It is a further object of the present invention to provide apparatus and associated methods for queuing I/O requests from one or more main processors to one or more I/O sub-processors.

It is yet another object of the present invention to provide apparatus and associated methods for queuing I/O completion messages from one or more I/O sub-processors to one or more main processors.

It is still another object of the present invention to provide apparatus and associated methods for balancing the reduction of overhead time required for processing I/O completion requests against the improvement of I/O response time.

The above and other objects, features, and advantages of the present invention will become apparent from the following description and the attached drawing.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

I/O SYSTEM ARCHITECTURE

Figure 1:
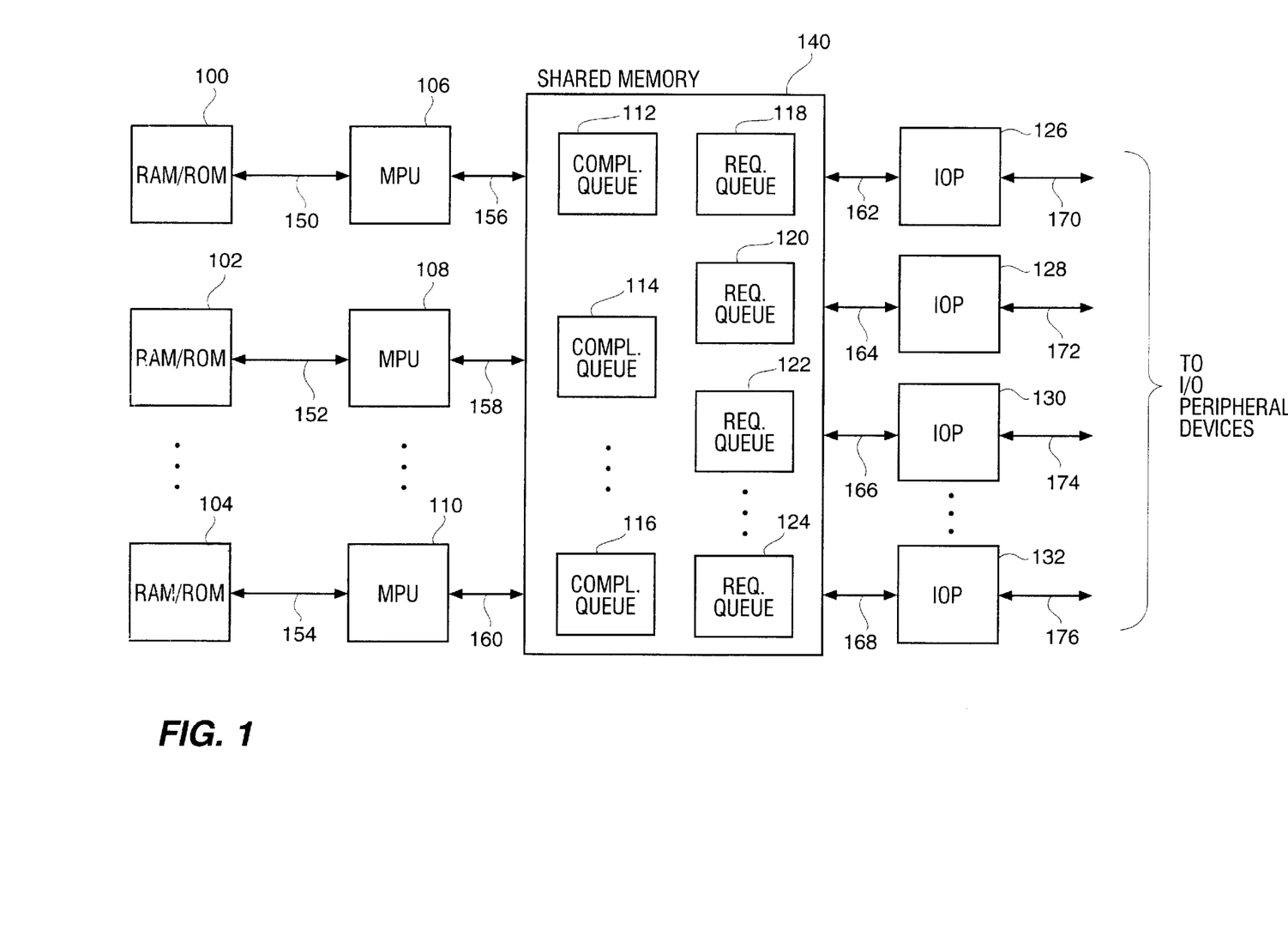
FIG. 1 is a block diagram of an exemplary embodiment of the present invention wherein a plurality of MPUs are connected to a plurality of IOPs through a shared memory containing a completion queue associated with each MPU and a request queue associated with each IOP.

FIGS. 1–3 and 8 depict exemplary preferred embodiments of I/O system architectures of the present invention. FIG. 1 shows an exemplary embodiment implementing the apparatus of the present invention in conjunction with a plurality of main processing units (MPUs) 106–110, and a plurality of I/O sub-processors (IOP) 126–132. In FIG. 1, the I/O system of the present invention is embodied within shared memory 140. Each of the plurality of MPUs 106–110 is attached to a RAM/ROM memory device 100–104, respectively, via memory busses 150–154, respectively. RAM/ROM memory devices 100–104 are used by the corresponding MPUs 106–110, respectively, as private storage for data and program instructions unique to each of the MPUs 106–110. In addition, each of the plurality of MPUs 106–110 is connected to shared memory 140 via busses 156–160, respectively. IOPs 126–132 are in turn each connected to I/O peripheral devices via busses 170–176. In addition, IOPs 126–132 are each connected to shared memory 140 via busses 162–168.

MPUs 106–110 execute programmed instructions stored in RAM/ROM memory devices 100–104. When an MPU 106–I/O requires an input/output operation directed to or from an I/O peripheral device, it initiates a request to an appropriate IOPs 126–132 connected to the desired I/O peripheral device. The I/O request is directed from the originating MPU, through shared memory 140, to a selected IOP 126–132. The selected IOP 126–132, performs the requested I/O operation on behalf of the requesting MPU 106–110, and generates a completion status message to be returned to the requesting MPU unit 106–110 via shared memory 140.

To improve I/O performance of the I/O system, shared memory 140 of the present invention embodies a plurality of queues 112–124. Request queues 118–124 are each associated with one of the plurality of IOPs 126–132. MPUs 106–110 generate a new I/O request and add it to the request queue 118–124 associated with the selected IOP 126–132. Use of a request queue associated with each IOP permits the plurality of MPUs 106–110 to generate I/O requests in parallel without the need to wait for another MPU to complete its I/O request. One or more of the MPUs 106–110 may generate a plurality of such I/O requests and continue further processing while awaiting completion.

The IOPs 126–132 operate independently of the MPUs 106–110 to service I/O requests queued in each of their respective request queues 118–124. When an IOP completes processing of an I/O request queued in its respective request queue 118–124, it generates a completion status message for return to the MPU 106–110 which generated the I/O request. The completion status message is added to completion queues 112–116 associated with the MPU 106–110 which generated the I/O request. As discussed below in additional detail, use of the request queues 118–124 and the completion queues 112–116 permit improvements in the I/O performance of the I/O system depicted in FIG. 1.

One of ordinary skill in the art will readily recognize that a completion message may indicate an exception condition. Such exception condition message may require the MPU to intervene before the IOP can continue processing further requests. In such a case, the IOP would "freeze" or "halt" to prevent further processing of queued I/O requests in its associated request queue. The MPU which generated the I/O request causing the exception condition would then correct the problem (if any), rebuild the I/O request queue (if required), then signal the IOP to resume processing of any queued (re-queued) I/O requests.

I/O SYSTEM ARCHITECTURE-ALTERNATE EMBODIMENTS

Figure 2:
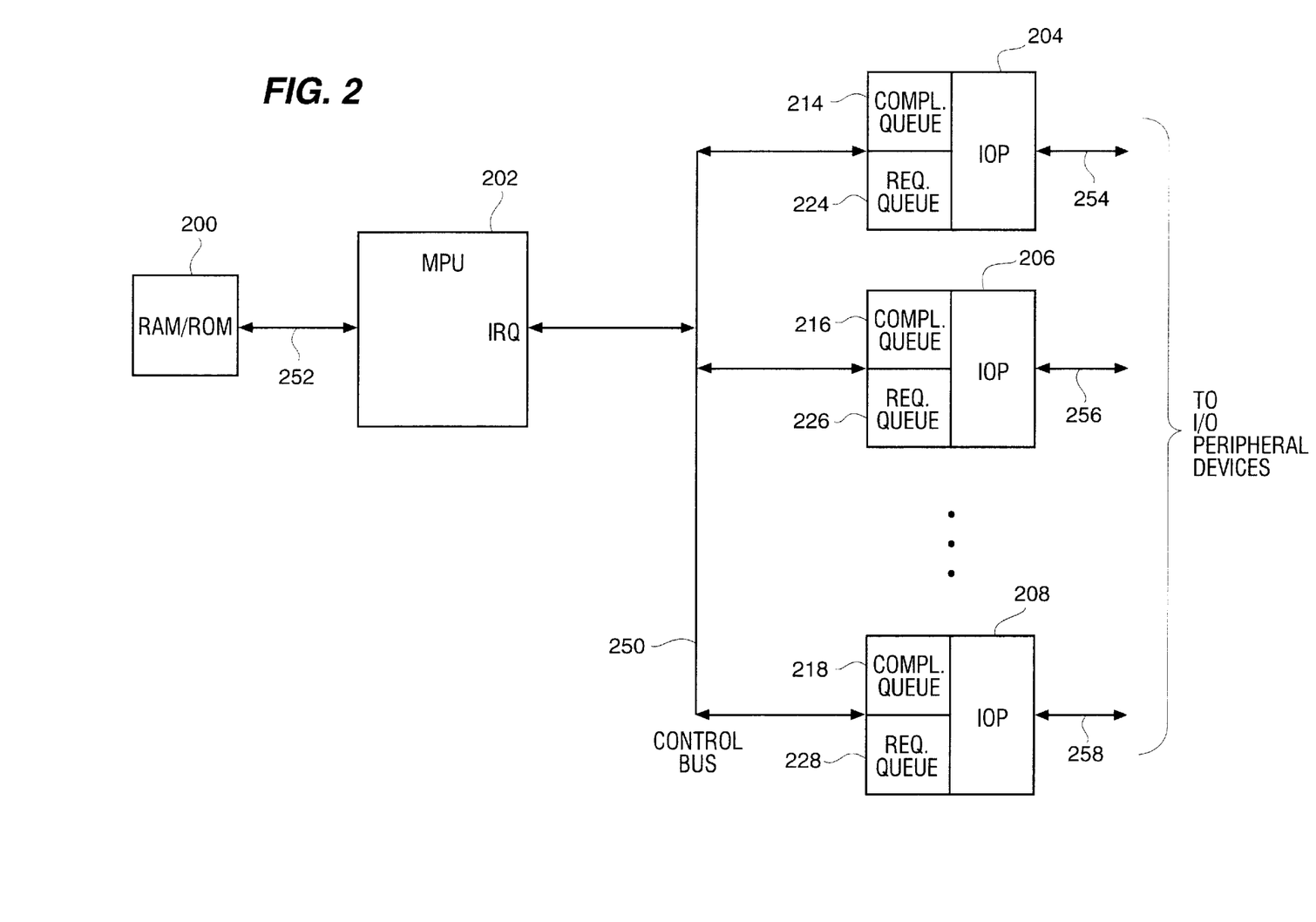
FIG. 2 is a block diagram of an exemplary embodiment of the present invention wherein a single MPU is connected to a plurality of IOPs over a bus where completion and request queues are implemented within each IOP.

FIG. 2 depicts an alternate embodiment of the present invention wherein a single MPU 202, connected to a private RAM/ROM memory device 200 via bus 252, communicates with a plurality of IOPs 204–208 via control bus 250. IOPs 204–208, unlike the IOPs of FIG. 1, embed their respective completion queue and request queue within the IOP. Specifically, IOP 204 embeds within it circuitry for completion queue 214 and request queue 224, IOP 206 embeds within it circuitry for completion queue 216 and request queue 226, and IOP 208 embeds within its circuitry for implementing completion queue 218 and request queue 228. Unlike the shared memory architecture depicted in FIG. 1, FIG. 2 depicts a configuration in which the completion queues 214–218 and request queues 224–228 may be implemented as register files within the circuitry of the corresponding IOPs 204–208.

As described above with respect to FIG. 1, MPU 202 of FIG. 2 generates I/O requests for selected IOPs 204–208 which will in turn process the I/O request by communicating with I/O peripheral devices via busses 254–258. An I/O request generated by MPU 202 is added to request queue 224∝228 associated with the selected IOPs 204–208. Each of the IOPs 204–208 operates independently of the MPU 202 and the other IOPs to process I/O requests present in its corresponding embedded request queue 224–228, respectively. When IOPs 204–208 completes processing for an I/O request, a completion status message is generated and added to the completion queue 214–218 associated with the selected IOPs 204–208. An interrupt request signal (IRQ) is generated and applied to MPU 202 over control bus 250 to signify the completion of one or more I/O requests. MPU 202 then interrogates the status messages present in completion queues 214–218 to determine which I/O requests have been completed.

Figure 3:
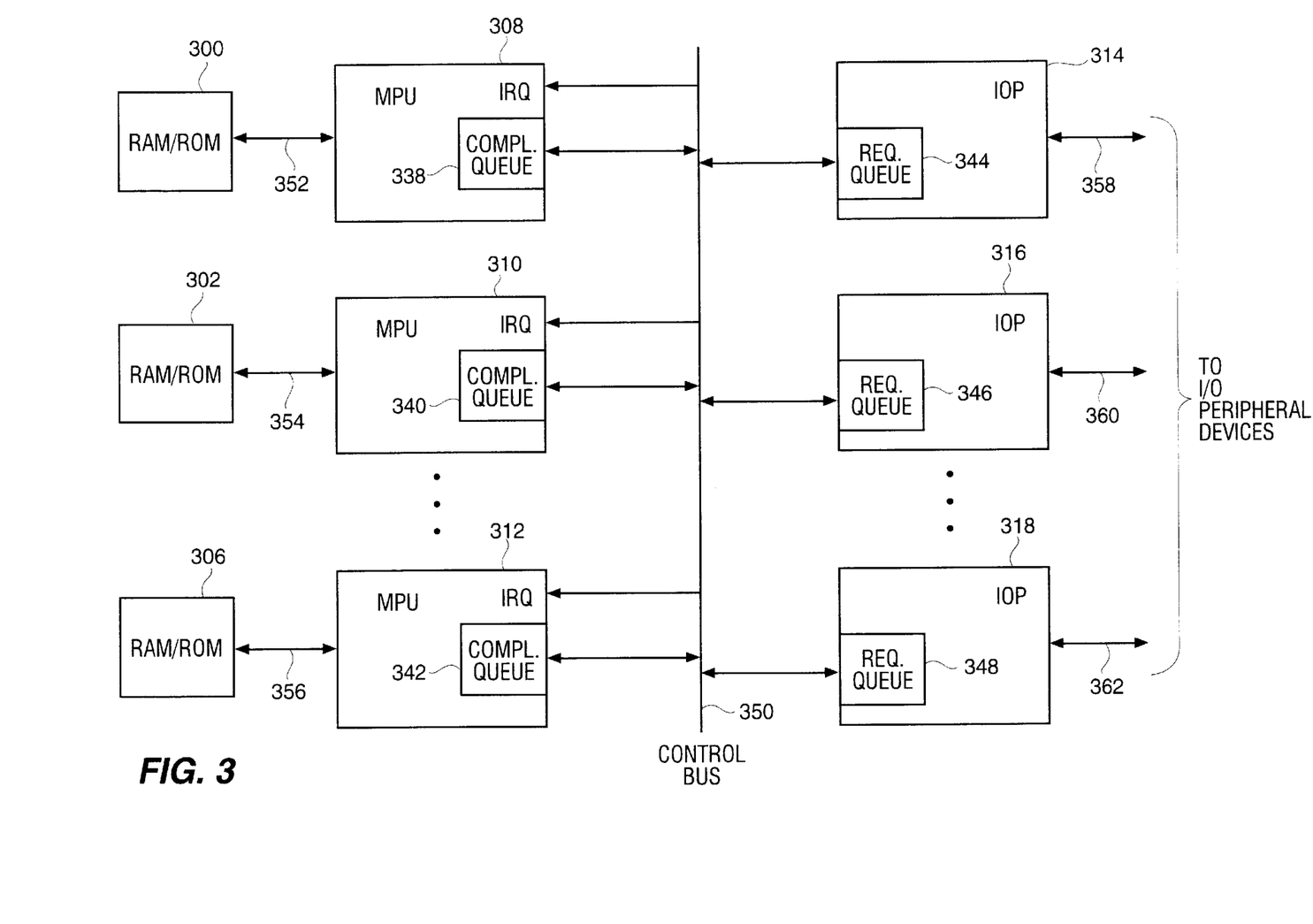
FIG. 3 is a block diagram of an exemplary embodiment of the present invention wherein a plurality of MPUs are connected to a plurality of IOPs over a bus where a completion queue is implemented within each MPU and a request queue is implemented within each IOP.

FIG. 3 depicts yet another alternate embodiment of the I/O system architecture of the present invention. As depicted in FIG. 3, a plurality of MPUs 308–312 are each connected to a private RAM/ROM memory device 300–306 via busses 352–356, respectively. The MPUs 308–312 are also connected, via control bus 350, to a plurality of IOPs 314–318. The IOPs 314–318 are in turn connected to a plurality of I/O peripheral devices via busses 358–362. As shown in FIG. 2, IOPs 314–318 of FIG. 3 embed within them appropriate circuitry for implementing request queues 344–348 respectively.

The embedded queues depicted in FIGS. 2 and 3 may be implemented by technology well known to those of ordinary skill in the art as a register file within the IOP circuits 314–318. MPUs 308–312 embed within their circuitry, appropriate circuits to implement completion queues 338–342. MPUs 308–312 generate I/O requests and add them to the request queues 344–348 corresponding to a selected one of IOPs 314–318. When the selected IOPs 314–318 completes processing of an I/O request from its request queues 314–348, respectively, a completion status message is generated and added to the completion queues 338–342 associated with the MPUs 308–312 which generated the I/O request.

Figure 8:
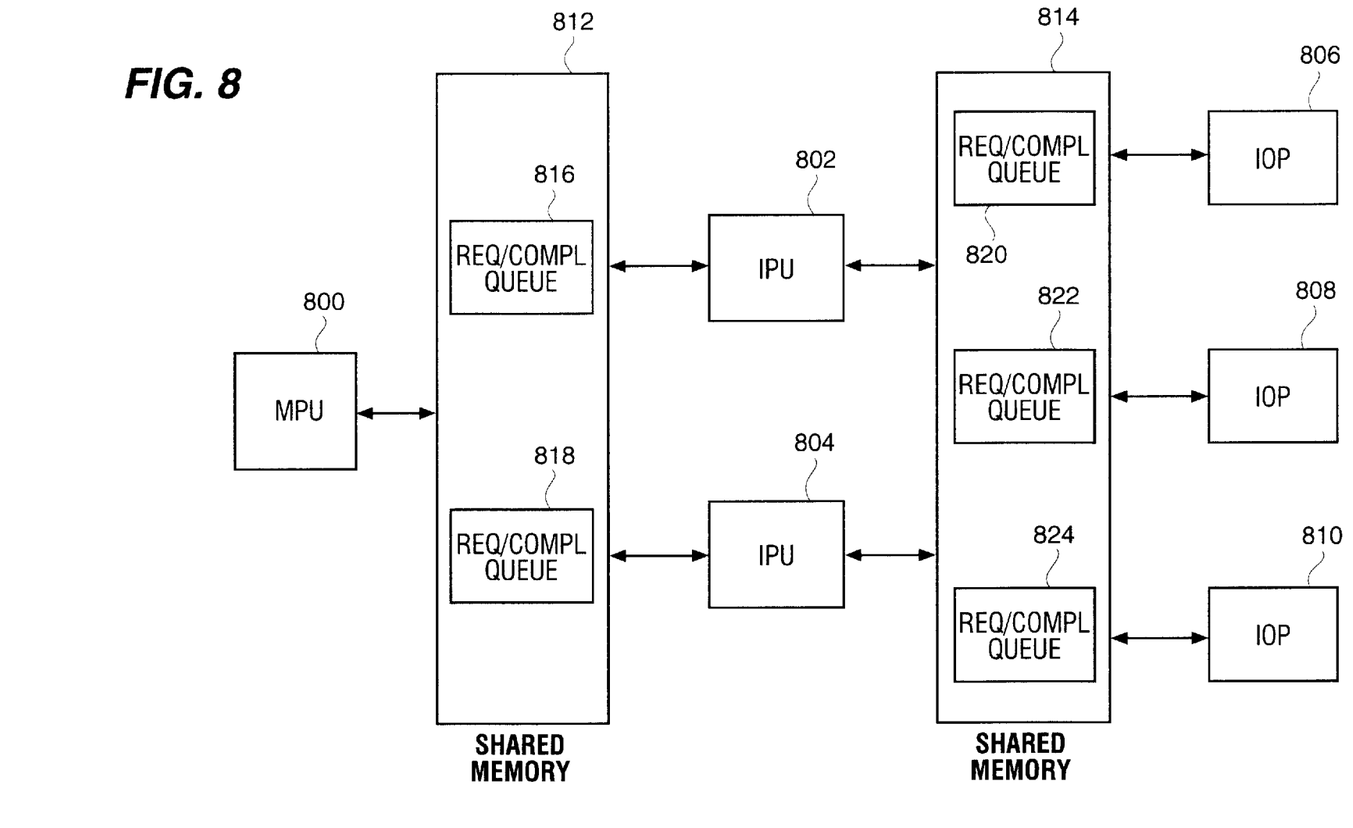
FIG. 8 is a block diagram of an exemplary embodiment of the present invention wherein a three level hierarchy I/O architecture connects a single MPU to a plurality of intermediate processing units (IPUs) through a shared memory and connects the intermediate processing units to a plurality of IOPs through a shared memory wherein both shared memories contain request/completion combined queues associated with the lower level processor.

FIG. 8 depicts yet another alternate embodiment of the present invention in which a plurality of lower level IOPs 806–810 communicate with a plurality of intermediate level processors (IPU) 802–804 through a shared memory 814. Intermediate level processors 802–804, in turn, communicate with MPU 800 through shared memory 812. As shown by FIG. 8, the communication methods and structures of the present invention are applicable to any level of a multi-level hierarchical communications architecture between I/O peripheral devices and higher level processors. Each level of the communications hierarchy communicates to the next higher level through queues in a shared memory architecture of the present invention.

Another aspect of the present invention is depicted in FIG. 8. Each of the queues 816–824 in FIG. 8 is a combined request/completion queue and is associated with a corresponding intermediate level processor 802–804 or IOPs 806–810, respectively. Each entry in the combined request/completion queue includes a status message portion which is initialized by the higher level processor when a request is added to the queue. The lower level processor writes an appropriate completion message in the status message portion of the queue entry when the corresponding I/O request is completed. This combined request/completion queue may be preferred in some instances to reduce complexity required in the lower level processor to locate an appropriate completion queue associated with an upper level processor.

I/O SYSTEM ARCHITECTURE-BEST MODE

The architectures presented in FIGS. 1–3 and 8, and described above, are intended as exemplary of a variety of embodiments which one of ordinary skill will recognize as within the scope and spirit of the present invention. One of ordinary skill in the art will readily recognize that the various elements and design choices represented in FIGS. 1–3 and 8 may be mixed in various combinations as preferred for a particular application or environment. Included among these design choices are: the preferred location of a particular queue, use of shared memory and associated software techniques or hardware register files, the association of a completion queue with the upper level processor or with the lower level processor, the integration of the request and completion queue into a single queue, etc.

The best presently known mode of implementation of the present invention depends upon numerous factors including; limitations and requirements of the software (operating system) with which the I/O architecture is to be used, hardware design complexity versus cost tradeoffs, software complexity versus cost tradeoffs, performance considerations of the I/O peripheral devices, and other factors. For simplicity of the description that follows, the present invention is described with reference to the I/O architecture of FIG. 2 in which a single MPU is connected to a plurality of IOPs, each with its own request and completion queue implemented as hardware register files within the IOP.

QUEUES

Figure 4:
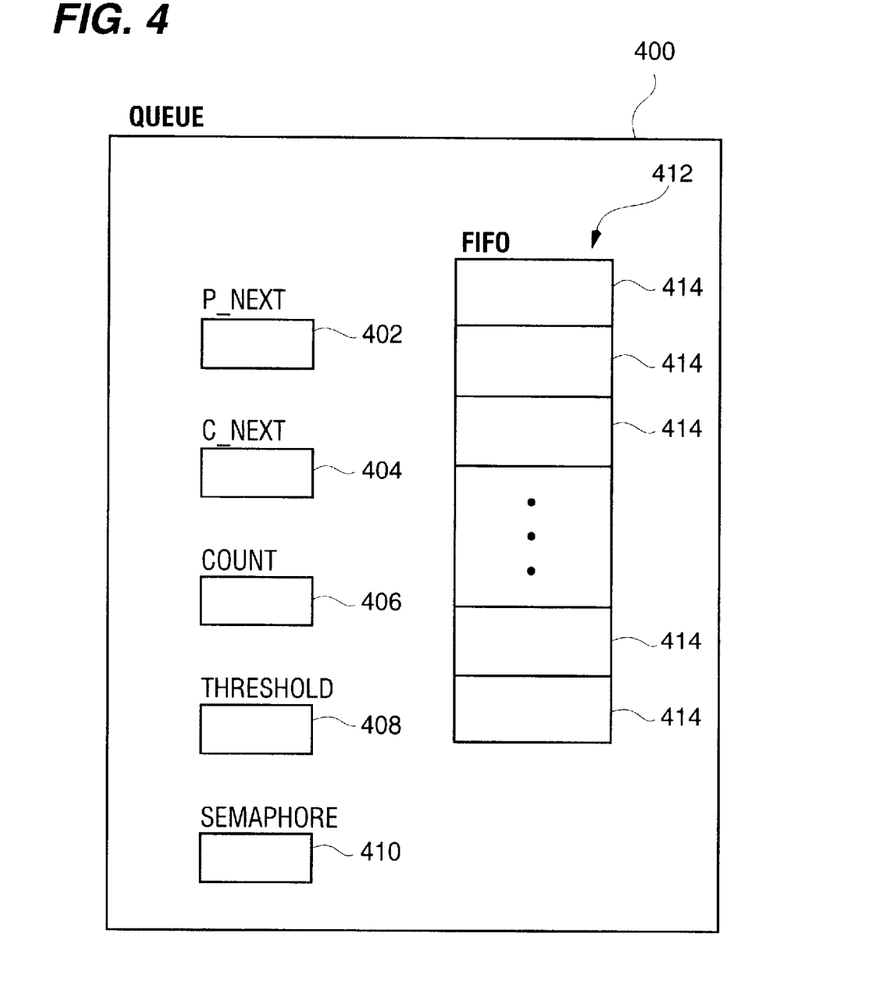
FIG. 4 is a block diagram depicting an idealized queue structure of the present invention which may be implemented equivalently in electronic designs or software structures.

FIG. 4 depicts a typical implementation of a queue 400. Queue 400 is to be considered exemplary of any of queues 112–124, 214–228, and 338–348 of FIGS. 1–3. One of ordinary skill in the art will readily recognize that queue 400, as described herein, may be implemented either with software techniques applied through typical processor technology to standard memory devices, or may be implemented by electronic circuits well known to those of ordinary skill in the art. Queue 400 is comprised of an array of memory elements which together comprise FIFO 412. A producer (an MPU in the case of a request queue or an IOP in the case of a completion queue) generates entries to be added to the next available element 414 of FIFO 412. The register P_NEXT 402 contains a pointer into FIFO 412 indicating the next available element 414 to be used by the producer. The value in P_NEXT register 402 increments as an index into the FIFO 412 in a circular fashion from the beginning of FIFO 412 through the last element of FIFO 412. A consumer (MPU in the case of a completion queue or an IOP in the case of a request queue) consumes elements 414, which had been filled by the producer in FIFO 412. The register variable C_NEXT 404 contains a pointer indicating the next filled element 414 of FIFO 412 which the consumer is to retrieve, empty, and process.

Each element 414 contains, in the case of a request queue, an I/O request generated by an MPU. Each element 414, in the case of a completion queue, contains a completion status message generated by an IOP at the completion of processing an I/O request. The COUNT register variable 406 contains the number of elements 414 filled in FIFO 412 by the producer and not yet consumed by the consumer. The THRESHOLD register variable 408, used primarily in implementing a completion queue, contains a number indicative of a threshold count register value at which point an interrupt request (IRQ) may be generated for the associated MPU. Use of the THRESHOLD and COUNT registers 408 and 406, respectively, is discussed in further detail below.

SEMAPHORE register variable 410 is used for purposes of achieving mutual exclusion among critical sections of simultaneously, independently, operating processes. In manipulating a queue, both an MPU and an IOP may need to manipulate variables within queue 400. Whichever processor requires manipulation of queue 400 must first successfully lock SEMAPHORE register variable 410. Use of such semaphore variables to achieve atomicity of operations within queue 400 is well known to those of ordinary skill in the arts and therefore need not be discussed further.

One of ordinary skill in the art will readily recognize that a variety of electronic circuits or software data structures may be utilized to implement a queue or FIFO as depicted in FIG. 4. For example, an electronic circuit implementing a register file including a FIFO may implement queue 400 as may a general purpose computer programmed to implement a stack, a circular (wrap-around) buffer, or linked list data structure. In addition, one of ordinary skill in the art will recognize that a semaphore as depicted in FIG. 4 may be implemented by well known software techniques, or by standard electronic components. As used herein a semaphore (depicted as SEMAPHORE register variable 410 in FIG. 4) means any software or electronic design or technique which enforces mutual exclusion between competing, cooperating, concurrent processes or circuits.

I/O SYSTEM METHODS

For simplicity, the methods discussed below are presented with respect to the I/O system architecture of FIG. 2 (with a single MPU). One of ordinary skill in the art will readily recognize that the methods discussed below may be easily extended to apply to a plurality of MPUs connected to a plurality of IOPs such as is depicted and described above with respect to FIGS. 1 and 3.

INITIATE I/O REQUEST

Figure 5:
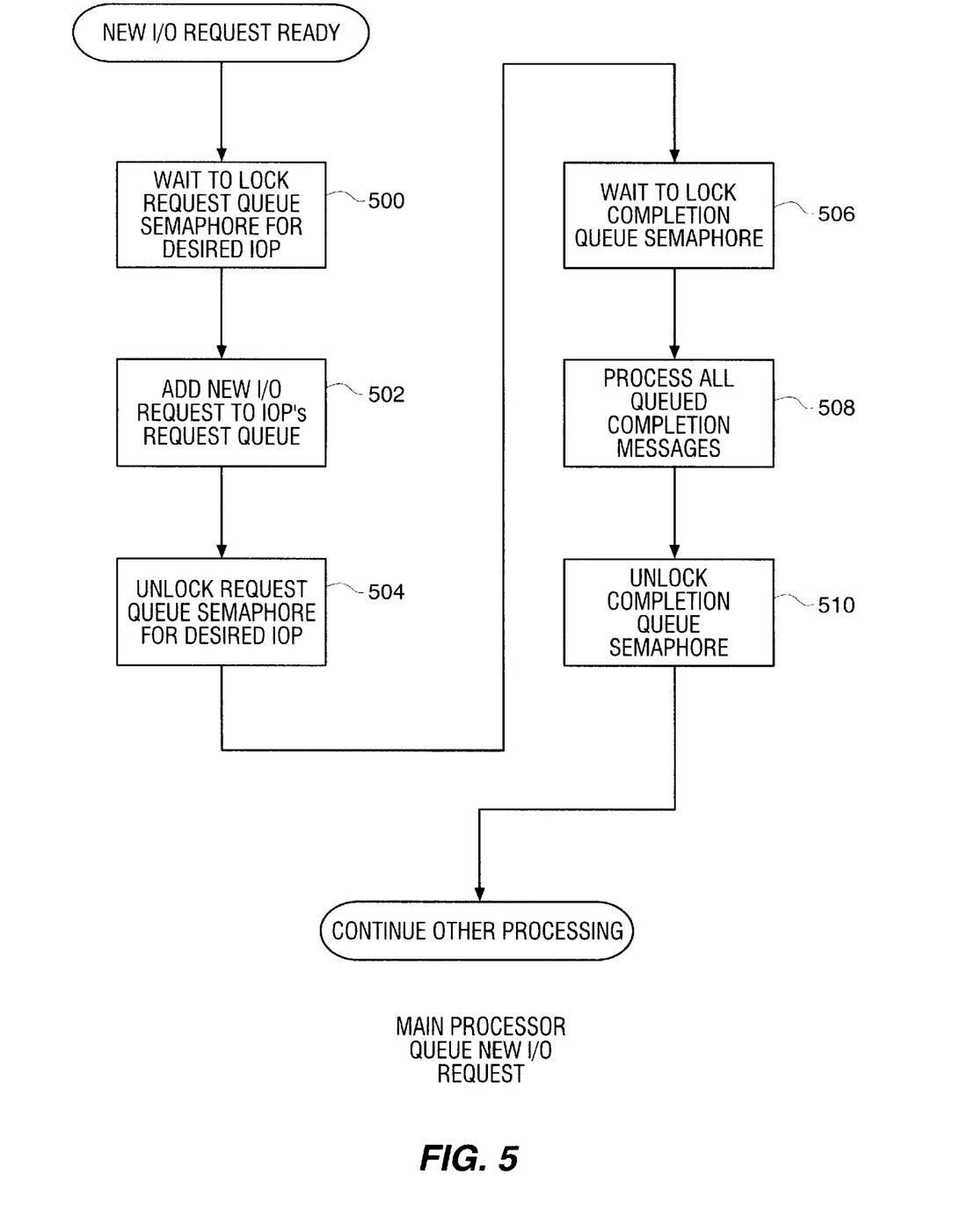
FIG. 5 is a flowchart of the I/O request generation process within a main processing unit in accordance with the methods of the present invention.

FIGS. 5–7 are flow charts describing the methods of the present invention, which operate within both MPUs and IOPs shown in FIGS. 1–3. FIG. 5 depicts the method operable within an MPU to add a new I/O request to a selected IOP's request queue. Element 500 is first operable to lock the semaphore variable associated with the request queue of the selected IOP. As is well known to those of ordinary skill in the arts, element 500 typically implements an atomic test and set or read-modify-write operation to wait for the semaphore to indicate its availability and simultaneously lock the semaphore to prevent other cooperating processes from accessing the queue. Once the semaphore is locked, element 502 is next operable to add the newly generated I/O request to the request queue of the selected IOP. Element 504 is next operable to unlock the semaphore of the request queue for the selected IOP.

Elements 506–510 are next operable to "poll" the completion queue(s) to determine whether any I/O requests have completed during the processing to initiate a new I/O request (elements 500–504 above). Polling for completed requests in this manner may further reduce the I/O overhead processing incurred by the MPU by avoiding any need for context switching to process an interrupt. If the completion messages are found in the queue before the interrupt is fielded, the MPU may process the completion messages (element 508) without the need for any interrupt request being generated (until later requests complete). As above, elements 506 and 510 are operable to lock and unlock the semaphore associated with the completion queue to assure mutual exclusion between competing critical sections in the MPU and the IOP. This completes processing for the MPU adding a new request to the request queue of a IOP. Further processing may continue in the MPU while awaiting the completion of the newly queued I/O request.

PROCESS I/O REQUEST

Figure 6:
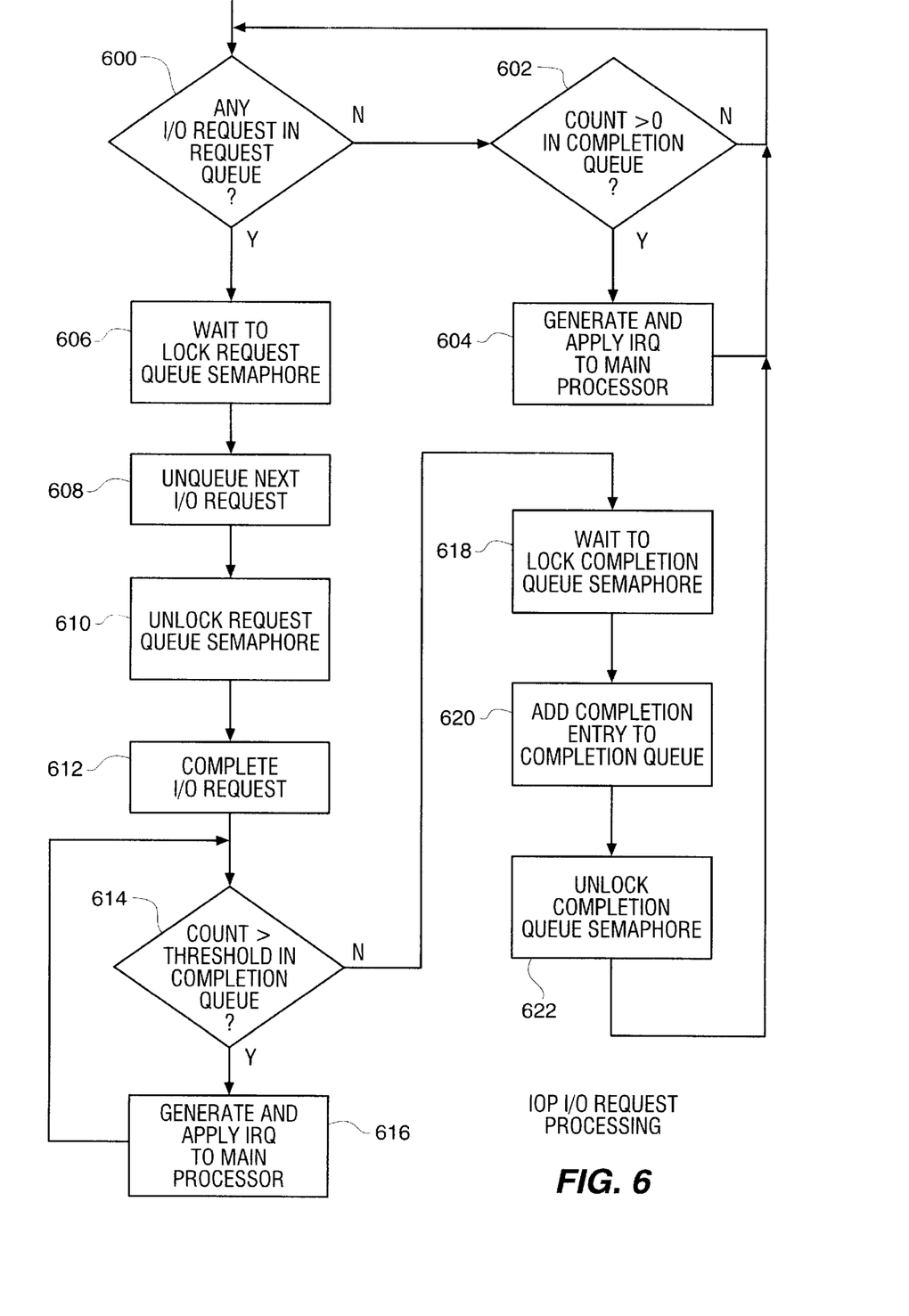
FIG. 6 is a flowchart of the I/O request processing within an I/O sub-processor in accordance with the methods of the present invention.

FIG. 6 is a flow chart depicting the method of the present invention operable within an IOP to process all I/O requests in the request queue associated with an IOP. Element 600 is operable to determine whether any I/O requests are available in the request queue associated with the IOP. Each I/O request is placed in an element of the FIFO in the request queue by operation of the MPU methods discussed above. If no I/O requests are found in the request queue, as indicated by the count variable of the request queue, element 602 and 604 are repetitively operable while waiting for a request to be added to the request queue. Element 602 determines whether any I/O operations have been completed by the IOP as indicated by the count variable in the completion queue associated with the IOP (as depicted in the embodiment of FIG. 2). If there are any entries in the completion queue of the IOP as indicated by the count variable exceeding zero, element 604 is next operable to generate an IRQ signal and apply the generated IRQ signal to the MPU as depicted in FIG. 2. In either case, processing continues by looping back to element 600 to await the addition of a new I/O request to the request queue of the IOP.

One of ordinary skill in the software arts will readily recognize that when a completion queue is associated with each of a plurality of MPUs, as depicted in the embodiments of FIGS. 1 and 3, elements 602 and 604 are of no significance and may be skipped. In such a circumstance, a completion queue may only be identified in association with the MPU which was the source of a specific I/O request. A specific I/O request in such a case includes an identification field uniquely identifying the MPU which originated the request. This is discussed below in further detail with respect to elements 614–622.

When element 600 determines that an I/O request has been added to the request queue of the IOP, processing continues at element 606 to lock the semaphore associated with the request queue of the IOP. As noted above, one of ordinary skill in the art will readily recognize that element 606 is a representative of an atomic operation to test and set a memory variable in a single, indivisible operation. Element 606 awaits the availability of the memory variable then sets the memory variable semaphore to preclude other cooperating processes from manipulating the locked request queue. Specifically, the method depicted in FIG. 5 and as shown here in elements 606–610, must be mutually exclusive to properly manipulate the request queue of an IOP.

Once the semaphore has been locked for the request queue, element 608 is next operable to unqueue the next I/O request previously added to the request queue. Implied in operation of element 608 is the decrementing of the count variable associated with the request queue as noted above with regards to FIG. 4. After an I/O request has been unqueued from the request queue of the IOP, element 610 is next operable to unlock the semaphore associated with the request queue. This permits other cooperating processes to continue operation (such as the method depicted and described above with respect to FIG. 5).

Element 612 represents all low level I/O processing required to be performed by the IOP in conjunction with the connected I/O peripheral device to complete the I/O request unqueued by operation of element 608.

Element 614 is then operable to determine whether the count variable associated with the completion queue of the MPU associated with the I/O request exceeds the threshold value associated with that queue. If the count variable presently exceeds the threshold variable, element 616 is operable to generate an IRQ signal and apply the generated IRQ signal to the MPU. Processing then continues by looping back to element 614 waiting for the MPU to service the generated interrupt (IRQ request) and thereby decrement the count variable associated with the completion queue of the MPU. Eventually, when the MPU has processed the completion queue, the count variable of the completion queue will be decremented below the threshold value of the completion queue. Processing then continues at element 618.

Element 618 is operable to lock the semaphore variable associated with the completion queue of the MPU. As noted above, one of ordinary skill in the art will readily recognize that element 618 performs an indivisible, atomic test and set operation on the semaphore variable of the completion queue. When the semaphore variable is successfully locked processing continues with element 620 to add a new completion status message entry to the completion queue. Element 622 is next operable to unlock the semaphore associated with the completion queue of the MPU. Finally, processing continues by looping back to element 600 awaiting another I/O request to be available in the request queue of the IOP.

As noted above, one of ordinary skill in the arts will recognize that use of the request queue as depicted and discussed in FIGS. 5 and 6 permits one or more MPUs to generate I/O requests and add them to the request queue despite the fact that the IOP may be busy processing another I/O request. This aspect of the present invention helps reduce idle time in the MPUs by avoiding unnecessary waits for an IOP which is presently, processing another I/O request.

When a completion queue is associated with each of a plurality of MPUs, as depicted in the embodiments of FIGS. 1 and 3, it will be further noted by one of ordinary skill in the arts that the operation of 614–622 which manipulate an completion queue must be adapted to identify a particular completion queue associated with a particular on of the MPUs. A specific I/O request in such a case includes an identification field uniquely identifying the MPU which originated the request. Specifically, elements 614–622 would use the identification field in each I/O request to identify the MPU which originated the I/O request. The completion queue specifically associated with that MPU would be selected for testing of the threshold, for locking/unlocking of a semaphore, and for the addition of a completion message.

IRQ SERVICING

Figure 7:
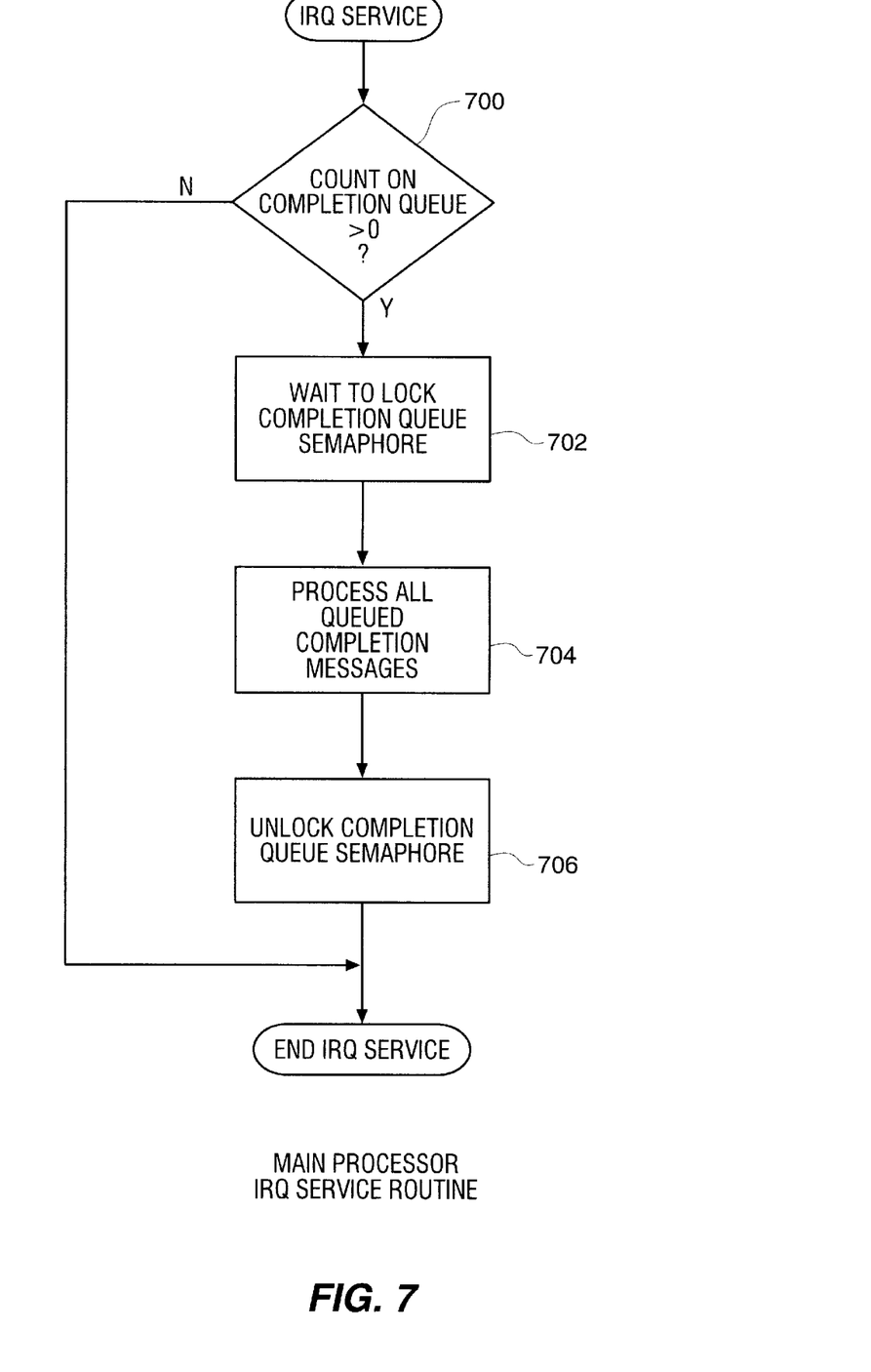
FIG. 7 is a flowchart of the interrupt servicing process within a main processing unit in accordance with the methods of the present invention.

FIG. 7 depicts a flow chart of the interrupt servicing function operable within MPUs in response to the generation and application of an IRQ signal by one or more IOPs. When an MPU receives an IRQ signal from an IOP, the current context of operation of the MPU is saved, typically in a stack structure within the private memory of the MPU (i.e. RAM memory devices as shown in FIGS. 1–3). The IRQ service routine is entered after the previous context has been saved. Such context switching operations are well known to those of ordinary skill in the arts and need not be discussed further.

Once in the IRQ service routine, element 700 is first operable to determine whether any entries are present in the completion queue associated with the MPU. If the count variable associated with the completion queue of the IOP indicates that no completion status messages are available in the queue, processing is completed and the saved context is restored for the continuation of processing in the MPU. If however, element 700 determines that there are completion status messages in the completion queue as indicated by the count variable exceeding zero, processing continues with element 702. Element 702 is then operable to lock the semaphore variable associated with the completion queue. As noted above, one of ordinary skill in the art understands that element 702 implements an atomic, indivisible test and set operation to lock the semaphore when available.

Once the semaphore variable is locked, thereby assuring exclusive access to the completion queue, element 704 is next operable to process all completion status messages queued in the completion queue. Implied in the processing element 704 is the resetting of the count variable associated with the completion queue. Since all completion message are processed, the count variable is reset to zero by operation of element 704. Following processing of all queued completion status messages, element 706 is operable to unlock the semaphore variable associated with the completion queue. The previously saved context of the MPU is then restored and normal processing continues.

One of ordinary skill in the art will recognize that the method of the present invention depicted in the flow chart of FIG. 7 permits improvements in the I/O performance of the I/O system by processing a plurality of completion status messages in the MPU in response to a single IRQ signal. In other words, a single interrupt service routine may process a plurality of completed I/O request operations. This reduces the overhead processing time incumbent on the MPU by reducing the number of interrupts received at the MPU.

EXTENDING TO MULTIPLE MPUs

The methods depicted in FIGS. 5–7 and described above, are primarily applicable to the embodiment of the present invention depicted in FIG. 2, one of ordinary skill in the arts will readily recognize modifications required in the methods of FIGS. 5–7 to adapt to the embodiments depicted in FIGS. 1 and 3 of the present invention. Specifically, in FIGS. 1 and 3, as opposed to FIG. 2, the completion queues are each associated with a specific one of the plurality of MPUs. Therefore, the method elements of FIGS. 6 and 7, which manipulate and test variables within the completion queue must identify a particular completion queue associated with a particular MPU to be manipulated. The best presently known mode for identifying such an associated MPU is to enter an identification field in each I/O request, as it is generated by an MPU, which identifies the MPU generating the I/O request. This identification field may then be used, for example, in elements 602 and 604, and elements 614–622 of FIG. 6 to identify the particular completion queue associated with the identified MPU. The methods depicted in FIGS. 5 and 7 are operable within a specific MPU unit and therefore implicitly determine the completion queue associated therewith.

I/O BALANCING

As noted above, the apparatus of the present invention enable operation of methods to balance the needs for rapid response to I/O requests with the needs for reducing overhead processing time in the MPUs for servicing interrupts. The queues of the present invention, as shown in FIG. 4, include a threshold value and a current count value. The current count value is used to indicate the number of entries presently stored in the FIFO of the queue. The threshold value is programmable to identify a particular level or value of the count register which should trigger an event.

In particular, the completion queues used to queue completion status messages to the MPUs may use the threshold values to determine the maximum number of I/O request completion status messages which may be queued befroe an IRQ signal is applied to the MPU unit. In this manner, the MPU (or IOP) may program the threshold value to balance these competing needs. For example, a lower threshold value will cause more interrupts to be generated as I/O requests are completed. A threshold of zero will cause an interrupt to be generated for each I/O completion status message generated and added into the queue. In this manner, the I/O completion messages are processed as soon as possible, but at the cost of more frequent interrupts to the MPU. A larger threshold value will reduce the number of interrupts generated at the MPU, but at the cost of slower response to the I/O completion status message.

As described above, the threshold value is of no particular use in the request queues associated with the IOPs.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a computing system having a plurality of main processing units communicating with a plurality of I/O sub-processors, an I/O interface system comprising:
   a request queue corresponding to each of said I/O sub-processors;
   a completion queue corresponding to each of said main processing units;
   means, in each of said main processing units, for generating I/O requests for processing by one of said I/O sub-processors and for adding said I/O requests to the request queues corresponding to said one of said I/O sub-processors;
   means, in each of said I/O sub-processors, for removing I/O requests from the request queue corresponding to each of said I/O sub-processors and for generating a completion message corresponding to each of said I/O requests removed from said request queue, said completion message further being added to said completion queue corresponding to one of said main processing units;
   interrupt means in each of said I/O sub-processors for generating and applying an interrupt request signal to any of said main processing units; and
   a queue depth threshold value corresponding to each of said completion queues, wherein each of said interrupt means generates said interrupt request signal when the number of completion messages added to the corresponding completion queue is greater than the corresponding queue death threshold value.

2. The I/O interface system of claim 1 wherein said queue depth threshold value is writable by each of said main processing units.

3. The I/O interface system of claim 1 wherein each said interrupt means generates said interrupt request signal when all said I/O requests are removed from the request queue corresponding to each of said I/O sub-processors.

4. The I/O interface system of claim 1 wherein each of said interrupt means generates said interrupt request signal when said completion message is added to the corresponding completion queue.

5. The I/O interface system of claim 1 further comprising:
   request semaphore means corresponding to each of said request queues for enforcing mutual exclusion of critical section operations on the corresponding request queue; and
   completion semaphore means corresponding to each of said completion queues for enforcing mutual exclusion of critical section operation on the corresponding completion queue.

6. The I/O interface system of claim 1 wherein said request queue and said completion queue reside in a shared memory connected to said main processing units and connected to said I/O sub-processors.

7. The I/O interface system of claim 6 wherein a said request queue and a said completion queue are combined within a single queue structure.

8. The I/O interface system of claim 1 wherein a said request queue and a said completion queue reside in each of said I/O sub-processors.

9. The I/O interface system of claim 8 wherein a said request queue and a said completion queue are combined within a single queue structure.

10. In a computing system having a plurality of main processing units communicating with a plurality of I/O sub-processors, an I/O interface method comprising:

generating, within each said main processing unit, I/O requests for processing by one of said I/O sub-processors;

adding said I/O requests to a request queue corresponding to said one of said I/O sub-processors; and removing, within each said I/O sub-processor, I/O requests from the request queue corresponding to each of said I/O sub-processors;

generating, within each said I/O sub-processor, a completion message corresponding to each of said I/O requests removed from said request queue;

adding said completion message to said completion queue corresponding to one of said main processing units;

generating an interrupt request signal;

applying said interrupt request signal to any of said main processing units; and generating said interrupt request signal when the number of completion messages added to the corresponding completion queue is greater than a corresponding queue depth threshold value.

11. The I/O interface method of claim 10 further comprising the step of:

writing said queue depth variable wherein said queue depth threshold value is writable by each of said main processing units.

12. In a computing system having a plurality of main processing units communicating with a plurality of I/O sub-processors, an I/O interface method comprising:

a) generating a list I/O requests within at least one of said plurality of main processing units;

b) adding said list to a request queue associated with at least one of said plurality of I/O sub-processors;

c) processing, within said at least one of said plurality of I/O sub-processors, an I/O request in said request queue;

d) queueing a completion message in a completion queue in response to said processing wherein said completion message indicates completion status of said processing of said I/O request;

e) repeating steps c) and d) for each I/O request in said request queue; and f) interrupting said at least one of said plurality of main processors in response to the number of completion messages in said completion queue exceeding a predetermined threshold value.

13. The method of claim 12 further comprising the step of:

processing the completion messages in said completion queue within said at least one of said plurality of main processors in response to the interrupting of said at least one of said plurality of main processors.

14. The method of claim 13 wherein the step of processing the completion messages includes the step of:

processing no more than a predetermined number of the completion messages in said completion queue in response to the interrupting of said at least one of said plurality of main processors.

15. The method of claim 12 wherein steps a) and b) are operable with said at least one of said plurality of main processors substantially concurrently with operation of steps c) and d) operable within said at least one of said plurality of I/O sub-processors.

16. The method of claim 15 wherein the step of adding includes the steps of:

locking a semaphore prior to adding said list to said request queue; and unlocking said semaphore in response to completion of addition of said list to said request queue, and wherein the step of processing the I/O requests includes the steps of:

locking said semaphore prior to adding said list to said request queue; and removing a next I/O request from said request queue; and unlocking said semaphore in response to removal of said next I/O request from said request queue.

* * * * *